(12) United States Patent
Furuya

(10) Patent No.: US 10,425,544 B2
(45) Date of Patent: Sep. 24, 2019

(54) STATE TRANSITION MANAGEMENT FOR INFORMATION PROCESSING SYSTEMS AND APPARATUSES

(71) Applicant: Konica Minolta, Inc., Chiyoda-ku, Tokyo (JP)

(72) Inventor: Yoshinobu Furuya, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/905,918

(22) Filed: Feb. 27, 2018

(65) Prior Publication Data

US 2018/0249030 A1   Aug. 30, 2018

(30) Foreign Application Priority Data

Feb. 28, 2017  (JP) ................................. 2017-037295

(51) Int. Cl.
*G06F 3/12* (2006.01)
*H04N 1/00* (2006.01)

(52) U.S. Cl.
CPC ..... *H04N 1/00503* (2013.01); *H04N 1/00244* (2013.01); *H04N 1/00384* (2013.01); *H04N 1/00493* (2013.01); *H04N 1/00888* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2009/0210733 A1 | 8/2009 | Akiba | |
| 2009/0219569 A1 | 9/2009 | Hara | |
| 2011/0292428 A1* | 12/2011 | Ishii | G06F 3/0482 358/1.13 |
| 2015/0242166 A1* | 8/2015 | Itaya | G06F 3/1221 358/1.14 |
| 2016/0261759 A1* | 9/2016 | Yanase | H04N 1/00204 |

FOREIGN PATENT DOCUMENTS

| | | |
|---|---|---|
| JP | 2009-196124 | 9/2009 |
| JP | 2009-206987 | 9/2009 |
| JP | 2013-235190 | 11/2013 |

* cited by examiner

*Primary Examiner* — Henok Shiferaw
(74) *Attorney, Agent, or Firm* — Baker Hostetler

(57) ABSTRACT

An information processing system includes an information processing apparatus, an image processing apparatus, a manipulation panel, and a first processor. The manipulation panel includes an input interface and a control circuit operable in a first mode in which the information input to the input interface is transmitted to the image processing apparatus or a second mode in which the information input to the input interface is transmitted to the information processing apparatus. When the first processor determines that the image processing apparatus transitions from a first state in which the input information input is able to be processed to a second state in which the input information is unable to be processed, the first processor instructs the control circuit to transition from the first mode to the second mode and outputs a transition notification to the information processing apparatus.

13 Claims, 18 Drawing Sheets

FIG.10

| ITEM | SETTING |
|---|---|
| STATE IN SERVER MODE | SLEEP/ACTIVE |

FIG.11

| ITEM | SETTING |
| --- | --- |
| PRESENTATION OF MANIPULATION PANEL IN SERVER MODE | ON/OFF |
| STATE OF MFP AFTER COMPLETION OF JOB IN SERVER MODE | SLEEP/ACTIVE |
| MANUAL SWITCHING FLAG | ON/OFF |

STATE TRANSITION MANAGEMENT FOR INFORMATION PROCESSING SYSTEMS AND APPARATUSES

The entire disclosure of Japanese Patent Application No. 2017-037295, filed on Feb. 28, 2017, is incorporated herein by reference in its entirety.

BACKGROUND

Technological Field

The present disclosure relates to an information processing system including an image processing apparatus and an information processing apparatus that shares a manipulation panel with the image processing apparatus, as well as the image processing apparatus included in such an information processing system.

Description of the Related Art

Conventionally, for reduction of power consumption, an image processing apparatus, such as an MFP (Multi-Functional Peripheral), is controlled to transition to a power saving mode as required. In the power saving mode, the image processing apparatus may also halt a function of receiving a manipulation onto a manipulation panel. There have been proposed various techniques for assisting an operation of the apparatus such as the image processing apparatus using another apparatus when the apparatus transitions to the power saving mode.

For example, Japanese Laid-Open Patent Publication No. 2013-235190 discloses a display system including an image forming apparatus and a controller. In the display system, a display of the image forming apparatus is connected to the external controller, and the controller activates the image forming apparatus again in response to detecting a manipulation onto a touch key/hard key of the display while the image forming apparatus is in the power saving state.

Japanese Laid-Open Patent Publication No. 2009-206987 discloses an information processing system including two or more information processing apparatuses. In the information processing system, when transitioning to the power saving state, an information processing apparatus transmits apparatus information of the information processing apparatus to another information processing apparatus in the form of packets. Accordingly, the information processing apparatus having received the transmitted packets provides service as a proxy of the information processing apparatus having transmitted the packets.

Japanese Laid-Open Patent Publication No. 2009-196124 discloses an information processing apparatus that assigns network addresses other than at least one of a plurality of network addresses to other information processing apparatuses and that returns from the power saving state when the at least one network address is accessed in the power saving state.

An information processing system may include: an image processing apparatus having a manipulation panel; and an information processing apparatus (such as a server) that shares the manipulation panel with the image processing apparatus. A user of such an information processing system may desire to input information to the information processing apparatus, such as setting information. However, when the image processing apparatus becomes unable to control the manipulation panel due to its transition to a sleep state or the like, there is no controller for the manipulation panel, with the result that the manipulation panel presumably cannot be controlled in the information processing system.

In view of the above, in an information processing system in which a manipulation panel is shared between an image processing apparatus and an information processing apparatus, there is a need for a technique for allowing the information processing apparatus to control the manipulation panel even when the image processing apparatus becomes unable to control the manipulation panel.

SUMMARY

To achieve at least one of the abovementioned objects, according to an aspect of the present invention, an information processing system reflecting one aspect of the present invention is provided. The information processing system comprises: an information processing apparatus; an image processing apparatus capable of communicating with the information processing apparatus; and a manipulation panel capable of communicating with the information processing apparatus and the image processing apparatus. The manipulation panel includes: an input interface that receives an input of information; and a control circuit operable in a first mode in which the information input to the input interface is transmitted to the image processing apparatus or a second mode in which the information input to the input interface is transmitted to the information processing apparatus. The information processing system further comprises a first processor capable of controlling communication of the information input from the manipulation panel. The first processor determines whether or not a state of the image processing apparatus transitions from a first state to a second state, the first state being a state in which the information input from the manipulation panel is able to be processed, the second state being a state in which the information input from the manipulation panel is unable to be processed. When the first processor determines that the state of the image processing apparatus transitions from the first state to the second state, the first processor instructs the control circuit of the manipulation panel to transition from the first mode to the second mode and outputs a transition notification to the information processing apparatus, the transition notification indicating that an operation mode of the control circuit transitions to the second mode.

To achieve at least one of the abovementioned objects, according to another aspect of the present invention, an image processing apparatus reflecting one aspect of the present invention is provided. The image processing apparatus is capable of communicating with an information processing apparatus and a manipulation panel. The manipulation panel is operable in a first mode in which information input to the manipulation panel is transmitted to the image processing apparatus or a second mode in which the information input to the manipulation panel is transmitted to the information processing apparatus. The image processing apparatus further comprises a first processor capable of controlling communication of the information input from the manipulation panel. The first processor determines whether or not the state of the image processing apparatus transitions from a first state to a second state, the first state being a state in which the information input from the manipulation panel is able to be processed, the second state being a state in which the information input from the manipulation panel is unable to be processed. When the first processor determines that the state of the image processing apparatus transitions from the first state to the second state, the first processor instructs the manipulation panel to transition from the first mode to the second mode and outputs a transition notification to the information processing apparatus, the transition notification indicating that an operation mode of the manipulation panel transitions to the second mode.

To achieve at least one of the abovementioned objects, according to still another aspect of the present invention, a non-transitory storage medium reflecting one aspect of the present invention is provided. The non-transitory storage medium stores a control program executed by a computer of an image processing apparatus capable of communicating with an information processing apparatus and a manipulation panel. The manipulation panel is operable in a first mode in which information input to the manipulation panel is transmitted to the image processing apparatus or a second mode in which the information input to the manipulation panel is transmitted to the information processing apparatus. The control program causes the computer to: determine whether or not a state of the image processing apparatus transitions from a first state to a second state, the first state being a state in which the information input from the manipulation panel is able to be processed, the second state being a state in which the information input from the manipulation panel is unable to be processed; and when determining that the state of the image processing apparatus transitions from the first state to the second state, instruct the manipulation panel to transition from the first mode to the second mode and output a transition notification to the information processing apparatus, the transition notification indicating that an operation mode of the manipulation panel transitions to the second mode.

To achieve at least one of the abovementioned objects, according to yet another aspect of the present invention, a method reflecting one aspect of the present invention is provided. The method is a method for controlling an image processing apparatus capable of communicating with an information processing apparatus and a manipulation panel. The manipulation panel is operable in a first mode in which information input to the manipulation panel is transmitted to the image processing apparatus or a second mode in which the information input to the manipulation panel is transmitted to the information processing apparatus. The method comprises: determining whether or not a state of the image processing apparatus transitions from a first state to a second state, the first state being a state in which the information input from the manipulation panel is able to be processed, the second state being a state in which the information input from the manipulation panel is unable to be processed; and when determining that the state of the image processing apparatus transitions from the first state to the second state, instructing the manipulation panel to transition from the first mode to the second mode and outputting a transition notification to the information processing apparatus, the transition notification indicating that an operation mode of the manipulation panel transitions to the second mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 10 shows an exemplary configuration of information stored in a storage of the MFP.

FIG. 11 shows an exemplary configuration of information stored in a storage of the server.

Each of FIGS. 14 to 17 shows a flow of a process in the server.

Figure 18:
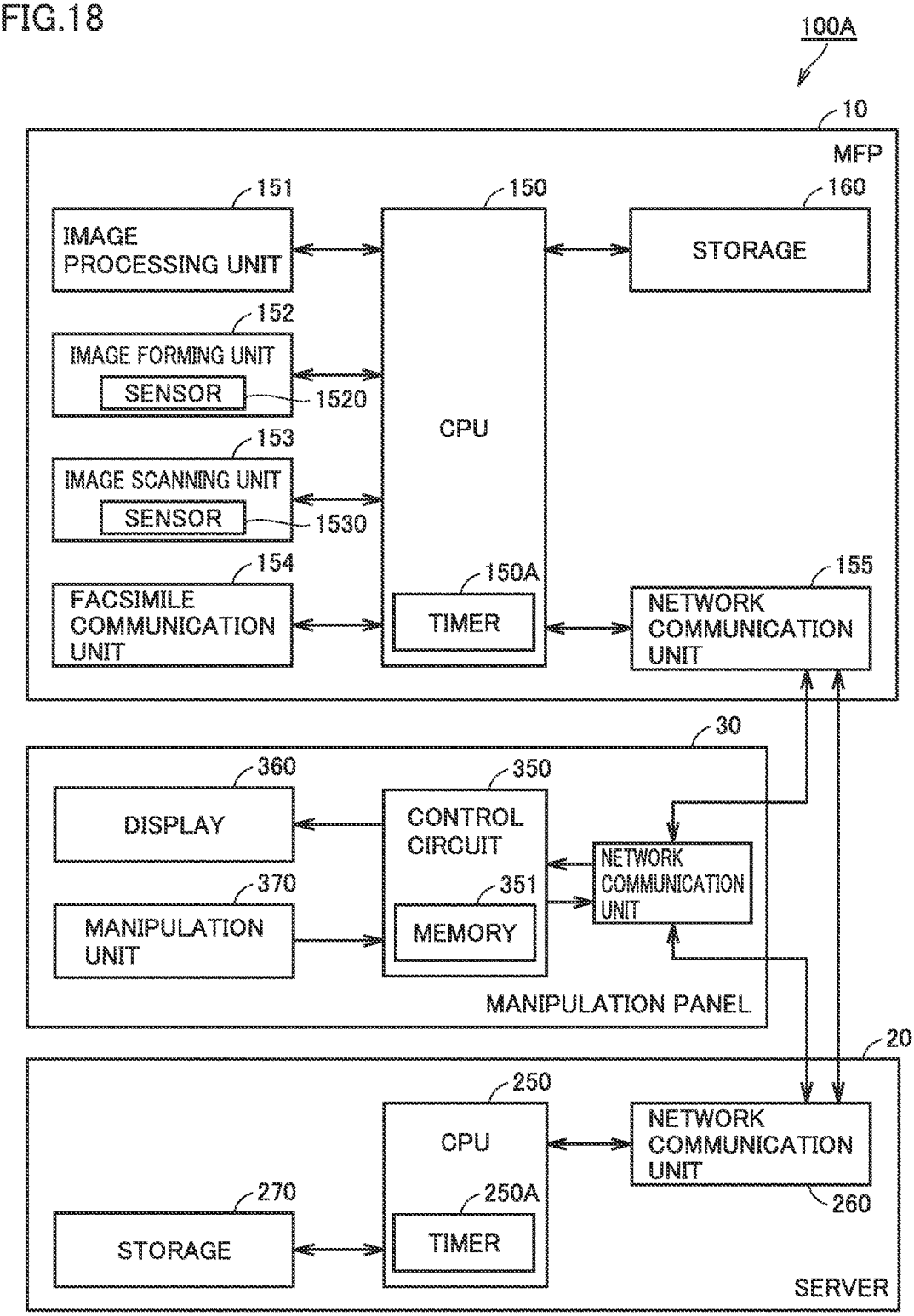

FIG. 18 illustrates a modification of the configuration of the information processing system.

DETAILED DESCRIPTION OF EMBODIMENTS

Hereinafter, one or more embodiments of the present invention will be described with reference to the drawings. However, the scope of the invention is not limited to the disclosed embodiments.

The following describes an embodiment of an information processing system with reference to figures. In the description below, the same reference characters are given to the same parts and components. Their names and functions are also the same. Therefore, they will not be described repeatedly.

1. External Appearance of Information Processing System

Figure 1:
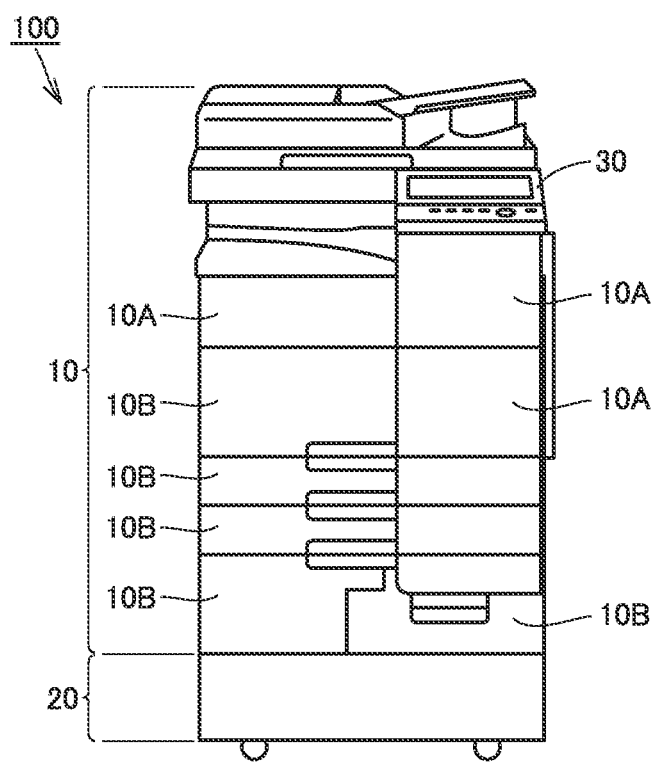
FIG. 1 shows an external appearance of an information processing machine, which is an exemplary information processing system.

FIG. 1 shows an external appearance of an information processing machine 100, which is an exemplary information processing system. As shown in FIG. 1, information processing machine 100 includes an MFP 10, a server 20, and a manipulation panel 30.

MFP 10 is an exemplary image processing apparatus, and performs various image processing operations. For example, the image processing operation includes at least one of printing of an image to a sheet, processing of image data, generation of image data of a document, and facsimile transmission of image data.

MFP 10 includes a plurality of elements (such as an image forming unit 152 in FIG. 9 as described below) provided for the image processing operations. The plurality of elements include: components accommodated in MFP 10, such as a toner cartridge; a door 10A for opening and closing a case that accommodates the components; and a sheet tray 10B that accommodates sheets for printing.

Server 20 is an exemplary information processing apparatus, and performs a process for management of a file (such as a document of an application) or the like.

Manipulation panel 30 receives a manipulation from outside. An operation mode of manipulation panel 30 includes an MFP mode and a server mode. In the MFP mode, manipulation panel 30 presents a manipulation screen of MFP 10, and transmits, to MFP 10, information corresponding to the received manipulation. In the server mode, manipulation panel 30 presents a manipulation screen of server 20, and transmits, to server 20, the information corresponding to the received manipulation.

2. Overview of Configuration of Information Processing System

Figure 2:
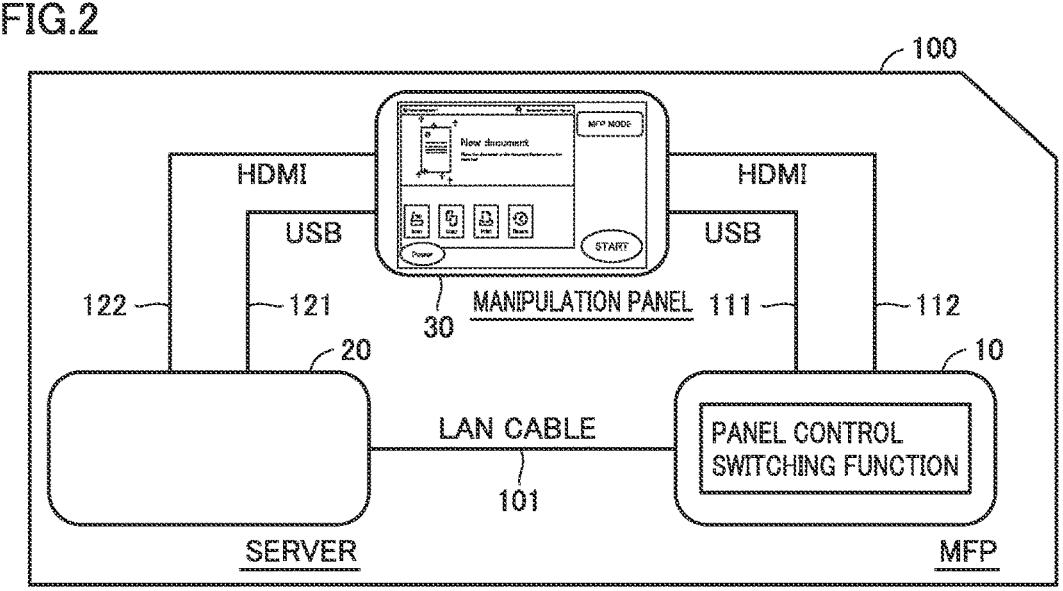
FIG. 2 illustrates an overview of a configuration of the information processing system (information processing machine).

FIG. 2 illustrates an overview of a configuration of the information processing system (information processing machine 100). FIG. 2 shows a specific example of connection among MFP 10, server 20, and manipulation panel 30 in information processing machine 100.

MFP 10 and server 20 are connected to each other via a LAN (Local Area Network) cable 101.

MFP 10 and manipulation panel 30 are connected to each other via a USB (Universal Serial Bus) cable 111 for data communication and an HDMI® (High-Definition Multimedia Interface) cable 112 for image information communication. MFP 10 transmits image data of an UI (User Interface) for the manipulation screen of MFP 10 to manipulation panel 30 via HDMI cable 112. When an input of a manipulation for MFP 10 is received, manipulation panel 30 transmits an indication of the manipulation to MFP 10 via USB cable 111.

Server 20 and manipulation panel 30 are connected to each other via a USB cable 121 for data communication and an HDMI cable 122 for image information communication. Via HDMI cable 112, server 20 transmits, to manipulation panel 30, image data of an UI for the manipulation screen of server 20. When an input of a manipulation for server 20 is received, manipulation panel 30 transmits an indication of the manipulation to server 20 via USB cable 111.

3. Mode of Manipulation Panel

Figure 3:
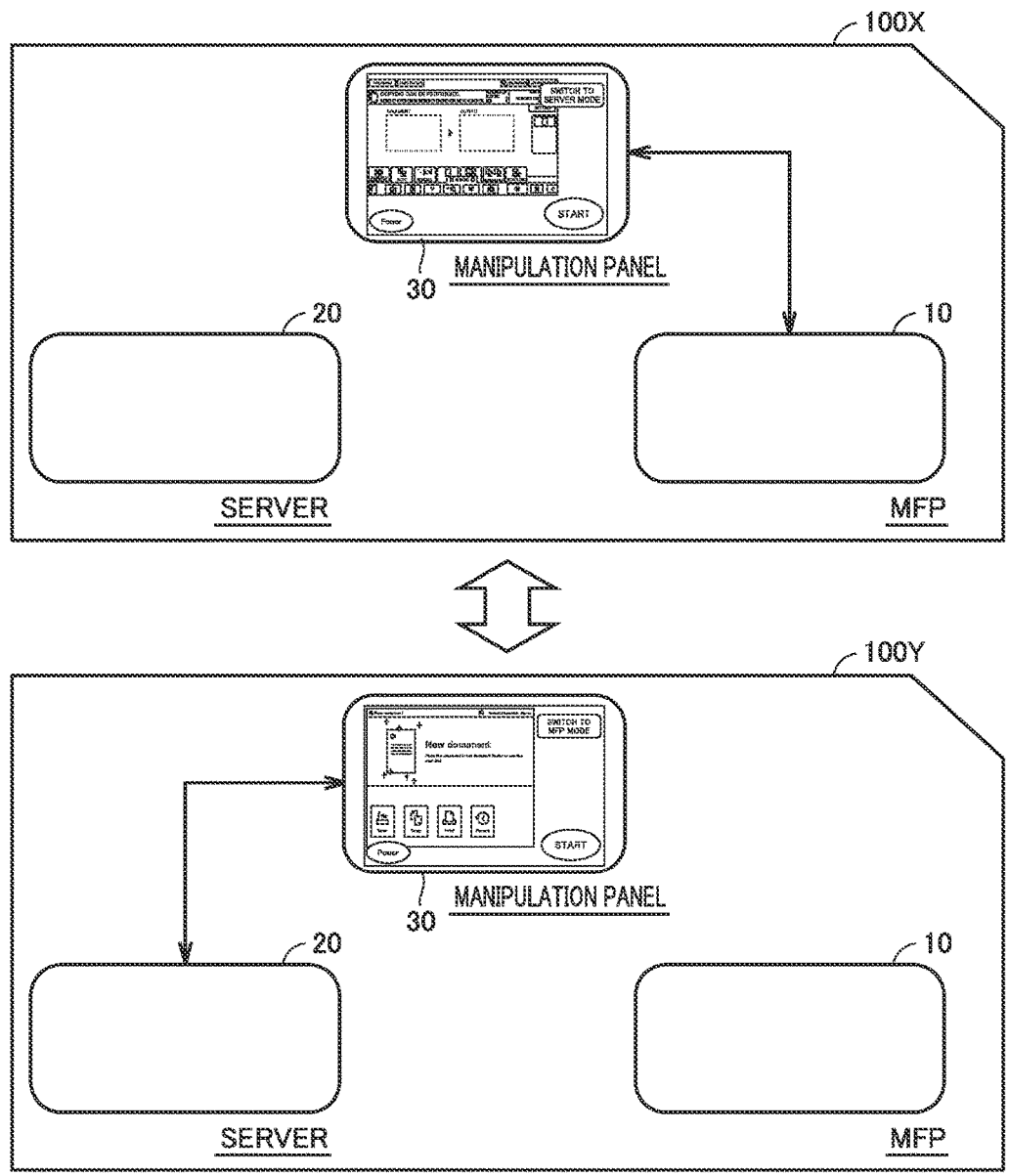
FIG. 3 illustrates two modes (an MFP mode and a server mode) of a manipulation panel.

FIG. 3 illustrates the two modes (the MFP mode and the server mode) of manipulation panel 30. A state 100X of FIG. 3 represents a state in which manipulation panel 30 is in the MFP mode within information processing machine 100. A state 100Y of FIG. 3 represents a state in which manipulation panel 30 is in the server mode within information processing machine 100.

As indicated as state 100X, in the MFP mode, manipulation panel 30 presents the UI of MFP 10 and transmits the indication of the input manipulation to MFP 10.

As indicated as state 100Y, in the server mode, manipulation panel 30 presents the UI of server 20 and transmits the indication of the input manipulation to server 20.

Specific examples of a condition for switching the mode of manipulation panel 30 from the MFP mode to the server mode include the following conditions <1A> and <1B>:

<1A> an input for mode switching (manipulation of a key 314 in FIG. 4 as described below) is performed in the UI of MFP 10; and <1B> a state in which MFP 10 is not operated continues for a predetermined time.

Specific examples of a condition for switching the mode of manipulation panel 30 from the server mode to the MFP mode include the following conditions <2A> and <2B>:

<2A> an input for mode switching (manipulation of a key 324 in FIG. 5 as described below) is performed in the UI of server 20; and <2B> a portion of MFP 10 other than manipulation panel 30 is manipulated (door 10A is opened, sheet tray 10B is drawn out, an ADF cover of an image scanning unit 153 is opened, or the like).

4. UI Presented on Manipulation Panel

Figure 4:
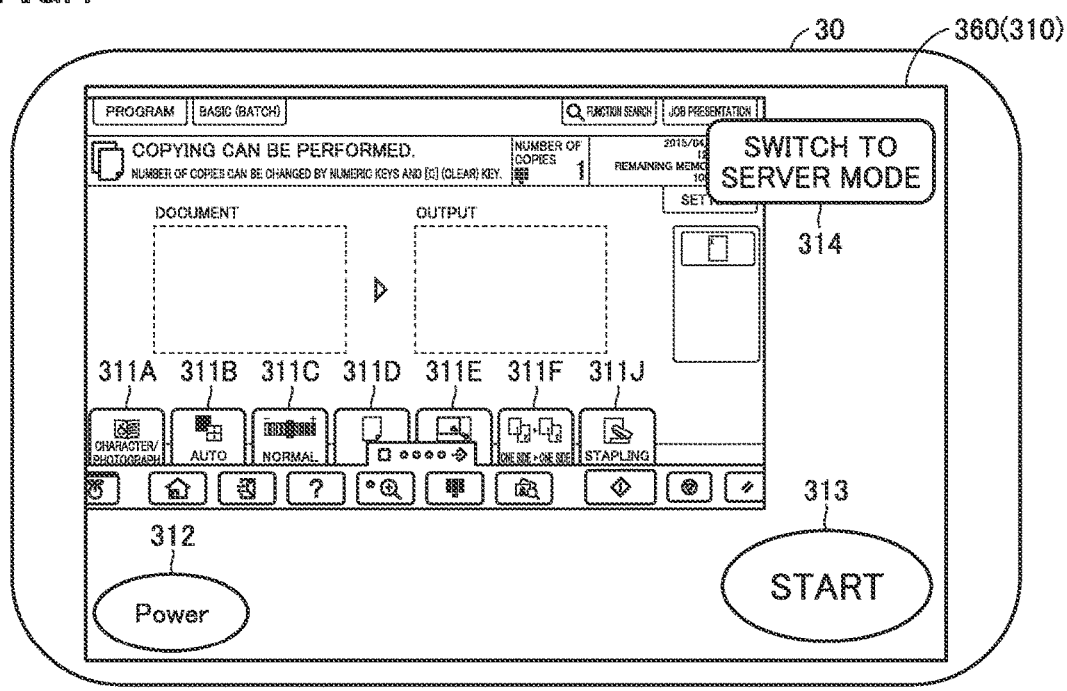
FIG. 4 shows the manipulation panel that presents a manipulation screen of an MFP.
Figure 5:
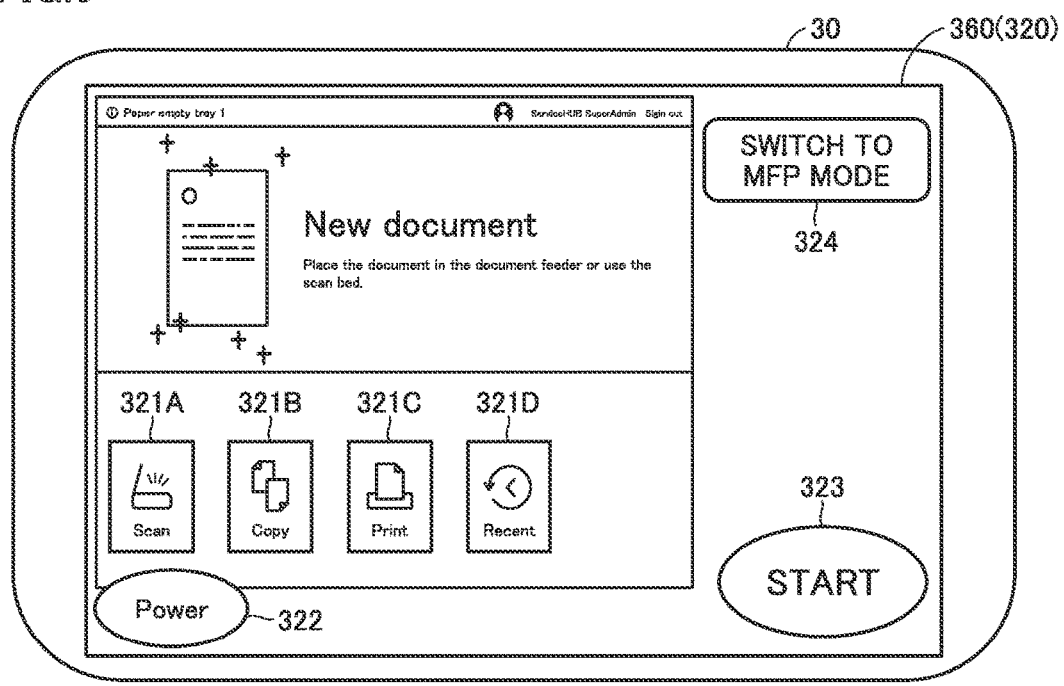
FIG. 5 shows the manipulation panel that presents a manipulation screen of a server.

Next, with reference to FIG. 4 and FIG. 5, the following describes specific examples of the UIs of MFP 10 and server 20.

(UI of MFP 10)

FIG. 4 shows manipulation panel 30 that presents the UI of MFP 10. As shown in FIG. 4, manipulation panel 30 includes a display 360. Display 360 is implemented by an organic EL (electroluminescence) display, for example. Display 360 of FIG. 4 presents a screen 310.

Screen 310 is the UI of MFP 10 and includes keys 311A to 311G. Each of keys 311A to 311G is a key for instructing a change in setting with regard to copying performed by MFP 10. Manipulation panel 30 transmits an input instruction to MFP 10. When the instruction is received, MFP 10 performs an operation in accordance with the instruction. MFP 10 may transmit, to manipulation panel 30, data of a new UI that is based on the input instruction. When the data of the new UI is received, manipulation panel 30 updates the presentation of display 360 in accordance with the data.

Screen 310 further includes keys 312, 313, 314. Key 312 is a key manipulated to turn off information processing machine 100. Key 313 is a key manipulated to instruct MFP 10 to start a copying operation. Key 314 is a key manipulated to instruct to switch the mode of manipulation panel 30 to the server mode.

(UI of Server 20)

FIG. 5 shows a manipulation panel 30 that presents the UI of server 20. Display 360 of FIG. 5 presents a screen 320.

Screen 320 is the UI of server 20 and includes keys 321A to 321D. Each of keys 321A to 321D is a key for inputting a setting with regard to an item of an operation performed by server 20. Key 321A is a key for instructing to generate image data by scanning a document and store the generated image data into server 20. Key 321B is a key for instructing to generate image data by scanning a document and print the generated image data. Key 321C is a key for instructing to print data stored in server 20. Key 321D is a key for instructing to present a list of the latest operations performed by server 20.

Manipulation panel 30 transmits an input instruction to server 20. When the instruction is received, server 20 performs an operation in accordance with the instruction. Server 20 may transmit, to manipulation panel 30, data of a new UI that is based on the input instruction. When the data of the new UI is received, manipulation panel 30 updates the presentation of display 360 in accordance with the data.

Screen 320 further includes keys 322, 323, 324. Key 322 is a key manipulated to turn off information processing machine 100. Key 323 is a key manipulated to instruct server 20 to start a predetermined operation. Key 324 is a key manipulated to instruct to switch the mode of manipulation panel 30 to the MFP mode.

5. Overview of Control of Mode Switching of Manipulation Panel

Figure 6:
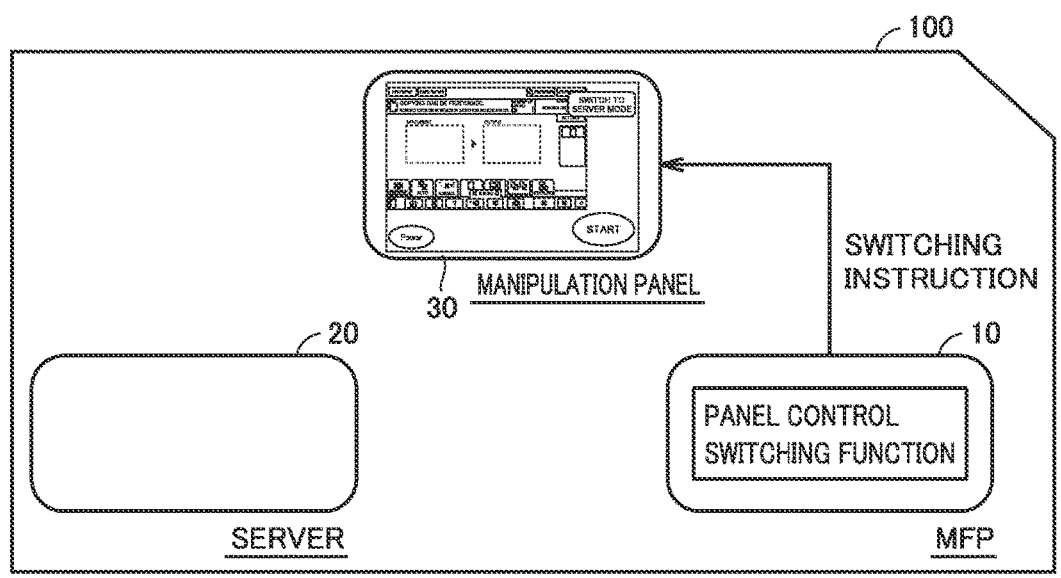
FIG. 6 schematically shows a flow of information in the information processing machine when switching the mode of the manipulation panel.
Figure 7:
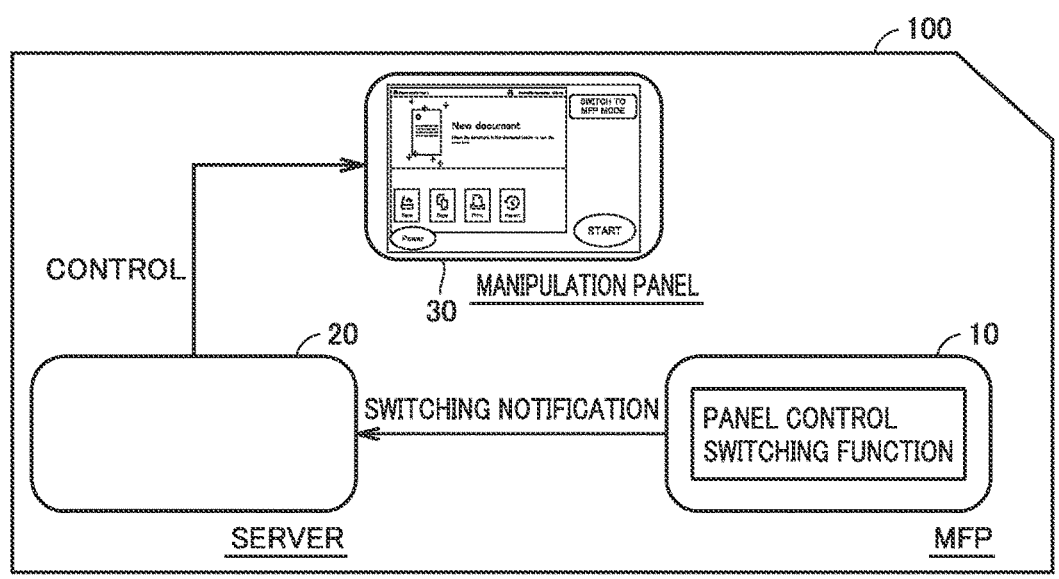
FIG. 7 schematically shows a flow of information in the information processing machine when switching the mode of the manipulation panel.
Figure 8:
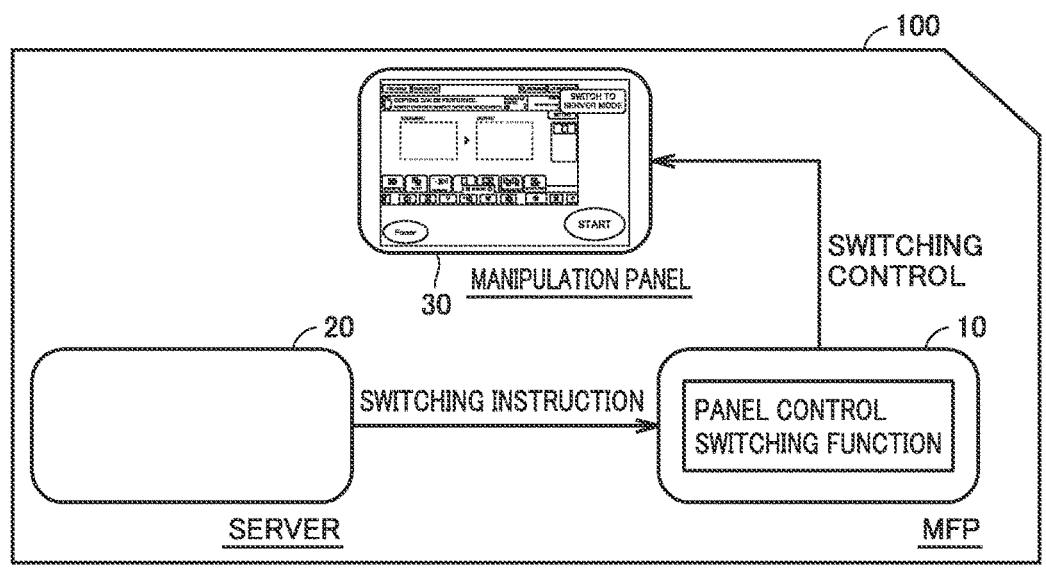
FIG. 8 schematically shows a flow of information in the information processing machine when switching the mode of the manipulation panel.

Next, with reference to FIGS. 6 to 8, the following describes an overview of control of the mode switching of manipulation panel 30. Each of FIGS. 6 to 8 schematically shows a flow of information in information processing machine 100 when switching the mode of manipulation panel 30.

FIG. 6 shows information processing machine 100 when manipulation panel 30 is in the MFP mode. In this state, when a condition for switching the mode of manipulation panel 30 from the MFP mode to the server mode is satisfied, a panel control switching function of MFP 10 (implemented by a CPU 150 of FIG. 9 as described below) instructs manipulation panel 30 to perform the mode switching.

As shown in FIG. 7, the panel control switching function further notifies the mode switching of manipulation panel 30 to server 20. In response to this, server 20 starts control of manipulation panel 30. Thereafter, manipulation panel 30 is operated in the server mode under control of server 20.

When a condition for switching the mode of manipulation panel 30 from the server mode to the MFP mode is satisfied, server 20 notifies the mode switching of manipulation panel 30 to MFP 10.

As shown in FIG. 8, when the notification from server 20 is received, the panel control switching function of MFP 10 instructs manipulation panel 30 to perform the mode switching. Thereafter, manipulation panel 30 is operated in the MFP mode under control of MFP 10.

As described with reference to FIGS. 6 to 8, in information processing machine 100, manipulation panel 30 is instructed only from (the panel control switching function of) MFP 10 to perform the mode switching. Thus, even when information processing machine 100 of the present disclosure is implemented by adding server 20 to the conventional information processing machine including only MFP 10 and manipulation panel 30, a change from the conventional configuration can be minimum. In other words, in each of the conventional information processing machine and the information processing machine of the present disclosure, while maintaining manipulation panel 30 to be mainly controlled by MFP 10, the UI of MFP 10 and the UI of server 20 can be presented on manipulation panel 30.

6. Hardware Configuration of Information Processing System (Information Processing Machine 100)

Figure 9:
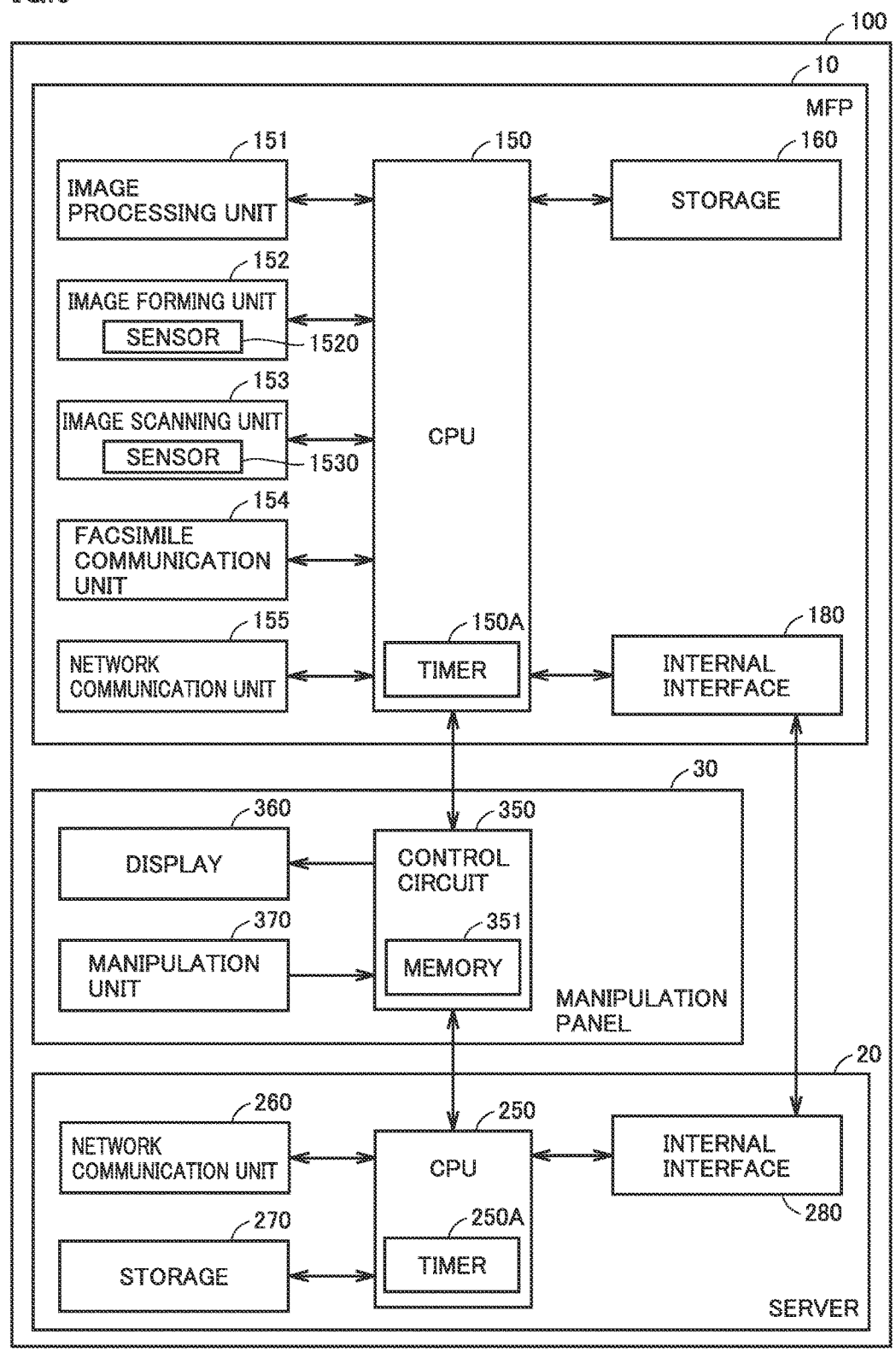
FIG. 9 is a hardware block diagram of the information processing machine.

FIG. 9 is a hardware block diagram of information processing machine 100. The following describes respective configurations of MFP 10, server 20, and manipulation panel 30 included in information processing machine 100.

(MFP 10)

As shown in FIG. 9, MFP 10 includes CPU (Central Processing Unit) 150 for general control and a storage 160. CPU 150 includes a timer 150A.

Storage 160 is implemented by a nonvolatile memory, for example. Information stored in storage 160 may include: a program to be executed by CPU 150; and data to be used for the execution of the program.

FIG. 10 shows an exemplary configuration of the information stored in storage 160 of MFP 10. The data stored in storage 160 includes a setting with regard to the state of MFP 10 when manipulation panel 30 is in the server mode. As shown in FIG. 10, one example of the information stored in storage 160 is a setting value for an item "STATE IN SERVER MODE". The setting value may indicate "SLEEP" or "ACTIVE". This setting value is referenced in a step SA118 (FIG. 13) described below. If the setting value indicates "SLEEP" while manipulation panel 30 is in the server mode, MFP 10 transitions to (maintains) the sleep state. If the setting value indicates "ACTIVE", MFP 10 transitions to (maintains) the active state.

MFP 10 further includes an image processing unit 151, an image forming unit 152, an image scanning unit 153, a facsimile communication unit 154, a network communication unit 155, and an internal interface 180.

For example, image processing unit 151 performs a process of increasing/decreasing the size of an output image by processing input image data. Image processing unit 151 is implemented by a processor and a memory for image processing, for example.

Image forming unit 152 is implemented by: hardware resources for forming an image on a recording sheet, such as a toner cartridge, a sheet tray for accommodating the recording sheet, and a photoconductor; and hardware resources for conveying the recording sheet. Image forming unit 152 includes a sensor 1520 for detecting: opening and closing of the door (door 10A of FIG. 1) for accommodating the toner cartridge or the like; and opening and closing of sheet tray 10B having the recording sheet accommodated therein.

Image scanning unit 153 is implement by a hardware resource configured to generate image data of a document, such as a scanner. Image scanning unit 153 includes a sensor 1530 for detecting opening and closing of the cover of the automatic document feeder.

Facsimile communication unit 154 includes an element for transmitting/receiving image data through facsimile communication, such as a modem.

Network communication unit 155 is implemented by a hardware resource configured to transmit and receive data via a network, such as a network card.

Since each function of image processing unit 151, image forming unit 152, image scanning unit 153, facsimile communication unit 154, and network communication unit 155 is well known in the image forming apparatus, they will not be repeatedly described herein in detail.

Internal interface 180 functions as a communication interface for communication with server 20, and is implemented by a LAN card, for example.

(Server 20)

As shown in FIG. 9, server 20 includes a CPU 250 for general control, a network communication unit 260, a storage 270, and an internal interface 280. CPU 250 includes a timer 250A.

Network communication unit 260 is implemented by a hardware resource configured to transmit and receive data via a network, such as a network card.

Storage 270 is implemented by a nonvolatile memory, for example. Information stored in storage 270 may include: a program to be executed by CPU 250; and data to be used for the execution of the program. The data stored in storage 270 includes a setting with regard to the state of MFP 10 when manipulation panel 30 is in the server mode.

FIG. 11 shows an exemplary configuration of the information stored in storage 270 of server 20. As shown in FIG. 11, the data stored in storage 270 includes three setting items in server 20.

The first setting item is a setting value with regard to an item "PRESENTATION OF MANIPULATION PANEL IN SERVER MODE". This setting value may indicate "ON" or "OFF", and is referenced in a step SC102 of FIG. 14 described below. If the setting value of the item "PRESENTATION OF MANIPULATION PANEL IN SERVER MODE" indicates ON while manipulation panel 30 is in the server mode, server 20 causes manipulation panel 30 to turn on light. If the setting value indicates OFF while manipulation panel 30 is in the server mode, server 20 causes manipulation panel 30 to turn off light.

The second setting item is a setting value with regard to an item "STATE OF MFP AFTER COMPLETION OF JOB IN SERVER MODE". The setting value may indicate "SLEEP" or "ACTIVE", and is referenced in a step SC316 of FIG. 16 described below. If the setting value of the item "STATE OF MFP AFTER COMPLETION OF JOB IN SERVER MODE" indicates "ACTIVE" after MFP 10 performs the job while manipulation panel 30 is in the server mode, server 20 maintains the active state of MFP 10. If the setting value indicates "SLEEP", server 20 causes MFP 10 to transition to the sleep state.

The third setting item is a value indicating a state of "MANUAL SWITCHING FLAG". An initial value of the state of "MANUAL SWITCHING FLAG" indicates OFF. The state of "MANUAL SWITCHING FLAG" is changed to ON in a step SC202 of FIG. 15 described below, is changed to OFF in a step SC408 of FIG. 17 described below, and is referenced in a step SC330 of FIG. 16 described below. When the "plurality of elements provided for the image processing operation" in MFP 10 are manipulated while manipulation panel 30 is in the server mode, server 20 is operated in accordance with the state of "MANUAL SWITCHING FLAG".

That is, when the state of "MANUAL SWITCHING FLAG" indicates "OFF" (when the mode of manipulation panel 30 has transitioned from the MFP mode to the server mode due to occurrence of timeout in MFP 10), server 20 performs a process for changing the mode of manipulation panel 30 to the MFP mode. When the state of "MANUAL SWITCHING FLAG" indicates "ON" (when the mode of manipulation panel 30 has transitioned from the MFP mode to the server mode in response to a manipulation of key 314 (FIG. 4) in MFP 10), server 20 maintains the mode of manipulation panel 30 to be the server mode.

Internal interface 280 functions as a communication interface for communication with server 20, and is implemented by a LAN card, for example.

(Manipulation Panel 30)

Manipulation panel 30 includes a control circuit 350, a display 360, and a manipulation unit 370. Control circuit 350 controls an operation of manipulation panel 30. Control circuit 350 includes a memory 351 that stores data such as setting information or the like in manipulation panel 30.

Manipulation unit 370 receives an input onto manipulation panel 30. Manipulation unit 370 is an exemplary input interface. One example of manipulation unit 370 is a software key presented on display 360 (key 314 of FIG. 4, key 324 of FIG. 5, or the like).

7. Overview of Process in Information Processing System

Figure 12:
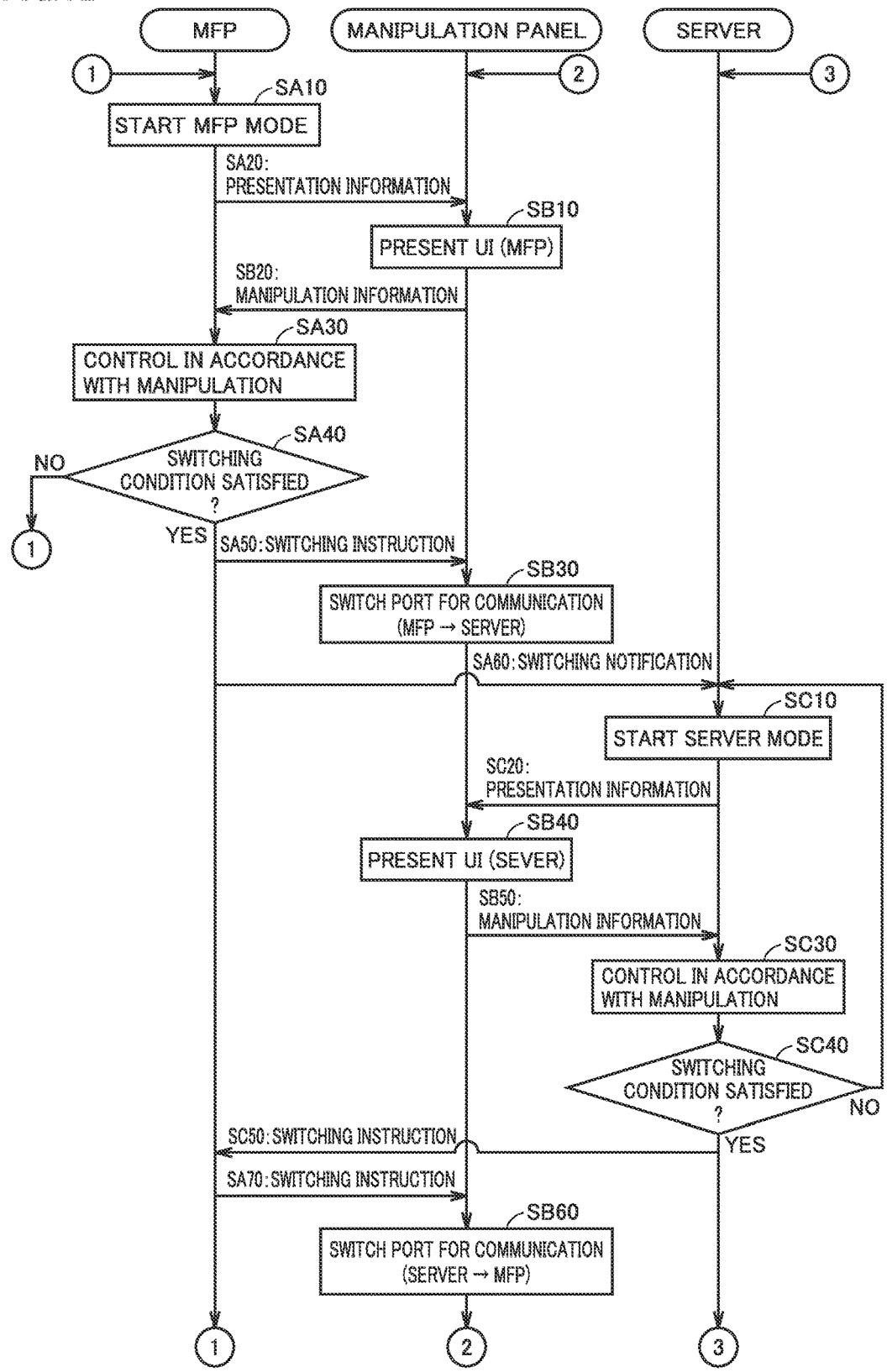
FIG. 12 illustrates an overview of the process in the information processing system (information processing machine).

FIG. 12 illustrates an overview of a process in the information processing system (information processing machine 100). With reference to FIG. 12, the following schematically describes a flow of information in information processing machine 100 with regard to the mode change of manipulation panel 30. The process performed by CPU 150 in FIG. 12 is implemented by CPU 150 executing a given program, for example. The process performed by CPU 250 is implemented by CPU 250 executing a given program, for example.

When power is supplied to MFP 10 (information processing machine 100), CPU 150 of MFP 10 starts control in the MFP mode of manipulation panel 30 in a step SA10. The control in step SA10 includes generating screen information (presentation information) of the UI of MFP 10 on manipulation panel 30, for example.

In a step SA20, CPU 150 transmits the presentation information to manipulation panel 30.

In a step SB10, in response to the transmission of the presentation information in step SA20, control circuit 350 of manipulation panel 30 presents the UI of MFP 10 on display 360.

It should be noted that control circuit 350 includes a port for communication with MFP 10 and a port for communication with server 20. The port for communication with MFP 10 is initially set. With this, control circuit 350 is configured to communicate with MFP 10 unless an instruction for mode changing is received. That is, when powering on MFP 10 (information processing machine 100), the mode of manipulation panel 30 is the MFP mode. The above-mentioned initial setting is stored in memory 351, for example.

In a step SB20, when an input of a manipulation onto manipulation unit 370 is detected, control circuit 350 transmits, to MFP 10, manipulation information corresponding to the input. For example, when a software key presented on display 360 is manipulated, control circuit 350 transmits, to MFP 10, information corresponding to the software key as the manipulation information.

In a step SA30, CPU 150 performs control in accordance with the manipulation in manipulation panel 30. For example, when a manipulation of changing a print setting is input in manipulation panel 30 and manipulation information corresponding to the manipulation is transmitted to MFP 10, CPU 150 changes the print setting in accordance with the manipulation information.

In a step SA40, CPU 150 determines whether or not a condition for switching the mode of manipulation panel 30 is satisfied. When it is determined that the condition is satisfied, CPU 150 brings the control to a step SA50 and a step SA60. When it is determined that the condition is not satisfied, CPU 150 returns the control to step SA10.

In step SA50, CPU 150 instructs manipulation panel 30 to switch the mode. In a certain embodiment, the instruction for switching the mode in step SA50 includes switching of the port for communication in control circuit 350 (switching from the port for communication with MFP 10 to the port for communication with server 20).

In step SB30, in response to the instruction in step SA50, control circuit 350 switches the port for communication from the port for communication with MFP 10 to the port for communication with server 20. Accordingly, the mode of manipulation panel 30 transitions from the MFP mode to the server mode.

In step SA60, CPU 150 notifies, to server 20, the switching of the mode of manipulation panel 30.

In a step SC10, CPU 250 of server 20 starts control in the server mode. The control in step SC10 includes generating screen information (presentation information) of the UI of server 20 in manipulation panel 30, for example.

In a step SC20, CPU 250 transmits the presentation information to manipulation panel 30.

In a step SB40, in response to the transmission of the presentation information in step SC20, control circuit 350 presents the UI of sever 20 on display 360.

It should be noted that control circuit 350 includes the port for communication with MFP 10 and the port for communication with server 20. The port for communication with MFP 10 is initially set. With this, control circuit 350 is configured to communicate with MFP 10 unless an instruction for mode changing is received. That is, when powering on MFP 10 (information processing machine 100), the mode of manipulation panel 30 is the MFP mode. The above-mentioned initial setting is stored in memory 351, for example.

In a step SB50, when an input of a manipulation onto manipulation unit 370 is detected, control circuit 350 transmits, to server 20, manipulation information corresponding to the input. For example, when a software key presented on display 360 is manipulated, control circuit 350 transmits, to server 20, information corresponding to the software key as the manipulation information.

In a step SC30, CPU 250 performs control in accordance with the manipulation in manipulation panel 30. For example, when an instruction for printing a file stored in server 20 is input in manipulation panel 30 and manipulation information corresponding to the instruction is transmitted to server 20, CPU 250 instructs MFP 10 to print the file.

In a step SC40, CPU 250 determines whether or not a condition for switching the mode of manipulation panel 30 is satisfied. When it is determined that the condition is satisfied, CPU 250 brings the control to a step SC50. When it is determined that the condition is not satisfied, CPU 150 returns the control to step SC10.

In a step SC50, CPU 250 instructs MFP 10 to switch the mode of manipulation panel 30. Then, CPU 250 returns the control to step SC10 and waits for a switching notification from MFP 10 (step SA60).

In a step SA70, in response to the mode switching instruction from server 20, CPU 150 of MFP 10 instructs manipulation panel 30 to switch the mode. In a certain embodiment, the instruction for switching the mode in step SA70 includes switching of the port for communication in control circuit 350 (switching from the port for communication with server 20 to the port for communication with MFP 10). Then, CPU 150 returns the control to step SA10.

In a step SB60, in response to the instruction in step SA70, control circuit 350 switches the port for communication from the port for communication with server 20 to the port for communication with MFP 10. Then, control circuit 350 returns the control to step SB10. Accordingly, the mode of manipulation panel 30 transitions to the MFP mode.

8. Flow of Process in Information Processing System

Figure 13:
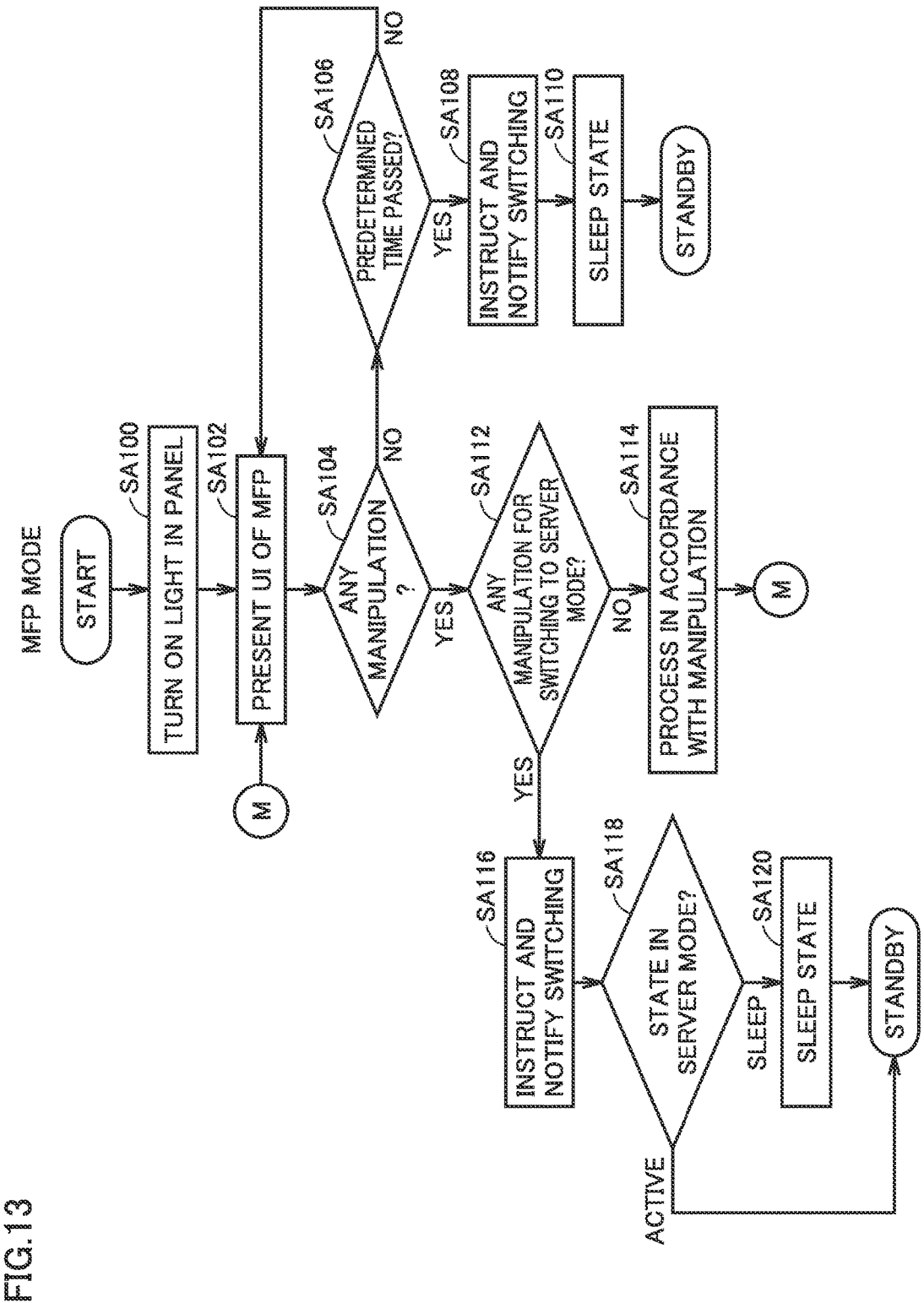
FIG. 13 shows a flow of a process in the MFP.

Each of FIG. 13 to FIG. 17 illustrates a flow of the process in the information processing system (information processing machine 100). Each of FIG. 13 to FIG. 17 shows the flow of the process shown in FIG. 12 more in detail. FIG. 13 shows the flow of the process in MFP 10, whereas each of FIG. 14 to FIG. 17 shows the flow of the process in server 20. The process performed by CPU 150 in FIG. 13 is implemented by CPU 150 executing a given program, for example. The process performed by CPU 250 in each of FIG. 14 to FIG. 17 is implemented by CPU 250 executing a given program, for example.

With reference to FIG. 13, in a step SA100, when MFP 10 is activated by supply of power to MFP 10 (information processing machine 100), CPU 150 of MFP 10 instructs manipulation panel 30 to turn on light.

In a step SA102, CPU 150 transmits, to manipulation panel 30, information for presenting the UI of MFP 10.

The control in step SA100 and step SA102 corresponds to step SA10 of FIG. 12.

In a step SA104, CPU 150 determines whether or not manipulation panel 30 is manipulated. For example, when manipulation information is received from manipulation panel 30, CPU 150 determines that manipulation panel 30 is manipulated. For example, when no manipulation information is received from manipulation panel 30, CPU 150 determines that manipulation panel 30 is not manipulated. When it is determined that manipulation panel 30 is manipulated (YES in step SA104), CPU 150 brings the control to a step SA112. When it is determined that manipulation panel 30 is not manipulated (NO in step SA104), CPU 150 brings the control to a step SA106.

In step SA106, CPU 150 determines whether or not a state in which manipulation panel 30 is not manipulated continues for a predetermined time. When it is determined that the state in which manipulation panel 30 is not manipulated does not continue for the predetermined time (NO in step SA106), CPU 150 returns the control to step SA102. When it is determined that the state in which manipulation panel 30 is not manipulated continues for the predetermined time (YES in step SA106), CPU 150 brings the control to step SA108. The control in step SA106 corresponds to the control in step SA40 of FIG. 12.

In a step SA108, CPU 150 instructs manipulation panel 30 to switch the mode and notifies the mode switching of manipulation panel 30 to server 20. The control in step SA108 corresponds to the control in step SA50 and step SA60 of FIG. 12.

In response to the instruction in step SA108, control circuit 350 of manipulation panel 30 switches the port for communication from the port for communication with MFP 10 to the port for communication with server 20. The switching of the port by control circuit 350 corresponds to the control in step SB30 of FIG. 12. Accordingly, the mode of manipulation panel 30 is switched from the MFP mode to the server mode.

The provision of the mode switching instruction from CPU 150 to manipulation panel 30 in step SA108 corresponds to the switching of the mode due to occurrence of timeout in MFP 10.

In a step SA110, CPU 150 controls the state of MFP 10 to transition to the sleep state. The sleep state is a state of stopping supply of power to at least a portion of CPU 150 that is used for communication with manipulation panel 30. Accordingly, an amount of power consumption in MFP 10 is reduced as compared with that in the state in which MFP 10 is activated in step SA100.

In step SA112, CPU 150 determines whether or not the manipulation onto manipulation panel 30 as detected in step SA104 is a manipulation for instructing transition to the server mode. When manipulation information received from manipulation panel 30 corresponds to a manipulation onto key 314, CPU 150 determines that the manipulation in manipulation panel 30 is a manipulation for instructing transition to the server mode. When manipulation information received from manipulation panel 30 corresponds to a manipulation other than the manipulation onto key 314, CPU 150 determines that the manipulation in manipulation panel 30 is not a manipulation for instructing transition to the server mode.

When it is determined that the manipulation onto manipulation panel 30 as detected in step SA104 is a manipulation for instructing transition to the server mode (YES in step SA112), CPU 150 brings the control to a step SA116. When it is determined that the manipulation onto manipulation panel 30 as detected in step SA104 is not a manipulation for instructing transition to the server mode (NO in step SA112), CPU 150 brings the control to a step SA114.

The control in step SA112 corresponds to step SA40 of FIG. 12.

In step SA114, CPU 150 performs a process in accordance with the manipulation onto manipulation panel 30 (manipulation information received from manipulation panel 30). The control in step SA114 corresponds to step SA30 of FIG. 12. Then, the control returns to step SA102.

In step SA116, CPU 150 instructs manipulation panel 30 to switch the mode and notifies the mode switching of manipulation panel 30 to server 20. The control in step SA116 corresponds to the control in step SA50 and step SA60 of FIG. 12.

In response to the instruction in step SA116, control circuit 350 of manipulation panel 30 switches the port for communication from the port for communication with MFP 10 to the port for communication with server 20. The switching of the port by control circuit 350 corresponds to the control in step SB30 of FIG. 12. Accordingly, the mode of manipulation panel 30 is switched from the MFP mode to the server mode.

In a step SA118, CPU 150 reads the setting value of the item "STATE IN SERVER MODE" in storage 160, and when the setting value indicates "SLEEP", CPU 150 brings the control to a step SA120.

In step SA120, CPU 150 controls MFP 10 to transition to the sleep state. Accordingly, MFP 10 stands by to wait for an input of information from outside.

In step SA118, when the setting value of the item "STATE IN SERVER MODE" indicates "ACTIVE", CPU 150 brings MFP 10 into the standby state without controlling MFP 10 to transition to the sleep state in step SA120.

Figure 14:
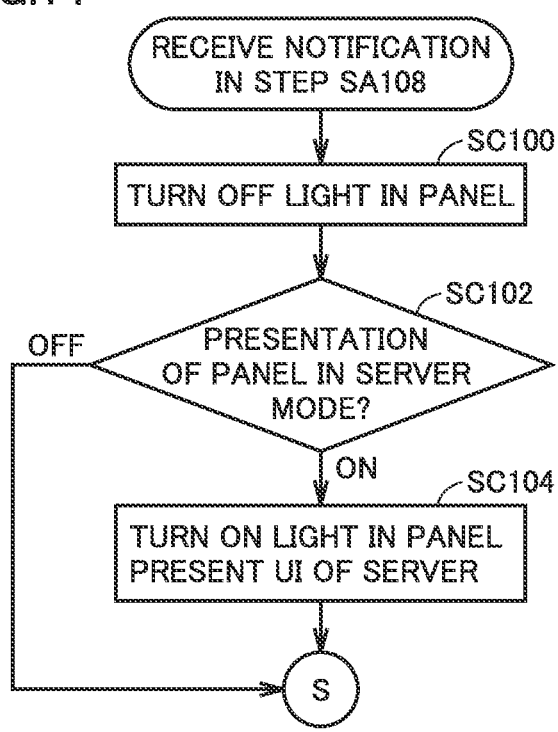

FIG. 14 shows a process performed by CPU 250 in response to the notification from CPU 150 to server 20 in step SA108.

As shown in FIG. 14, CPU 250 instructs manipulation panel 30 to turn off light in step SC100. In response to the instruction, manipulation panel 30 turn off light in display 360.

Figure 16:
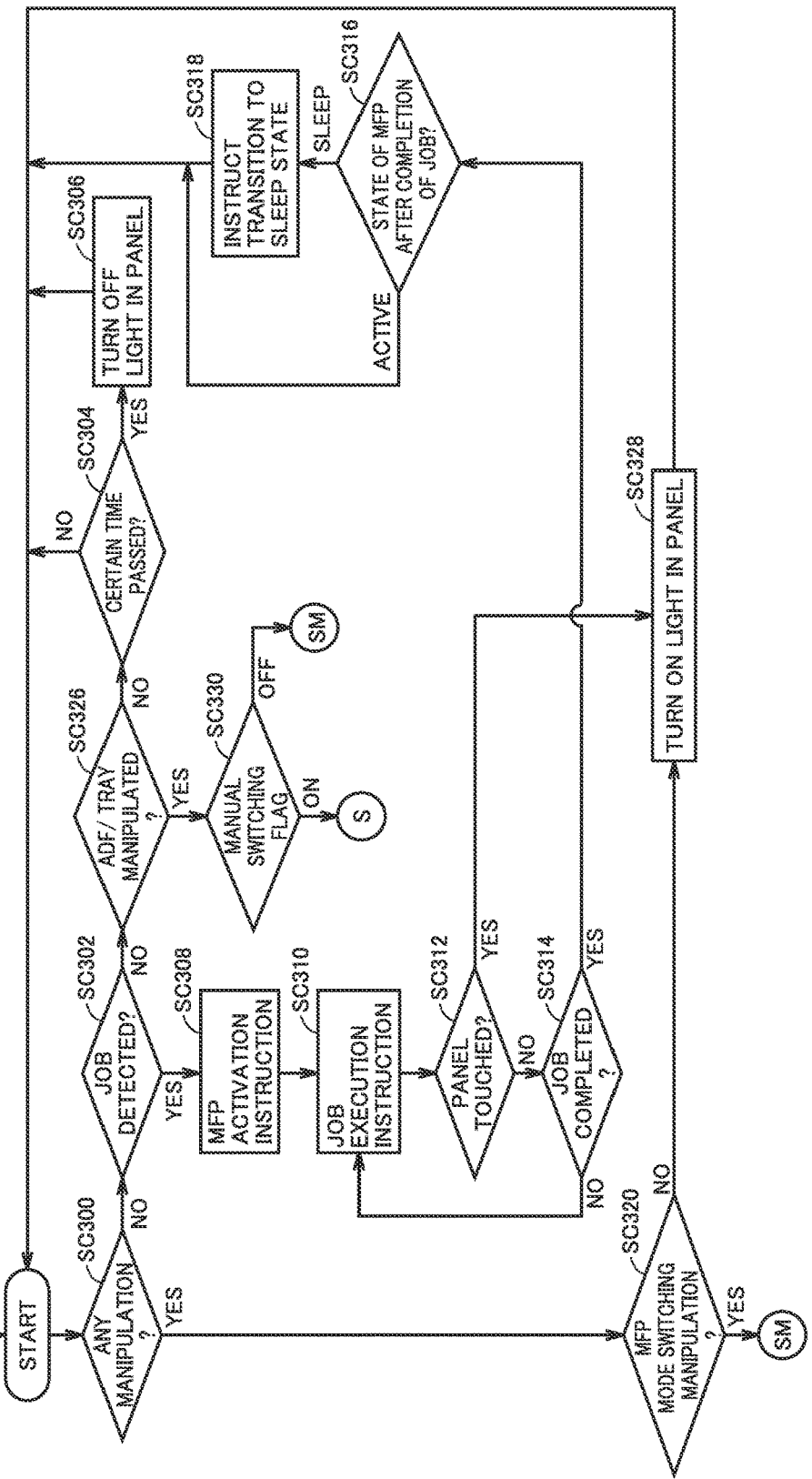

In a step SC102, CPU 250 reads the setting value of the item "PRESENTATION OF MANIPULATION PANEL IN SERVER MODE" stored in storage 270. When the setting value indicates "ON", CPU 250 brings the control to a step SC104. When the setting value indicates "OFF", CPU 250 brings the control to a step SC300 (FIG. 16).

In step SC104, CPU 250 instructs manipulation panel 30 to turn on light and transmits presentation information of the UI of server 20. The control in step SC104 corresponds to the control in step SC20 of FIG. 12. In response to the transmission of the presentation information in step SC104, control circuit 350 of manipulation panel 30 presents the UI of server 20 on display 360. Then, the control proceeds to step SC300 (FIG. 16).

Figure 15:
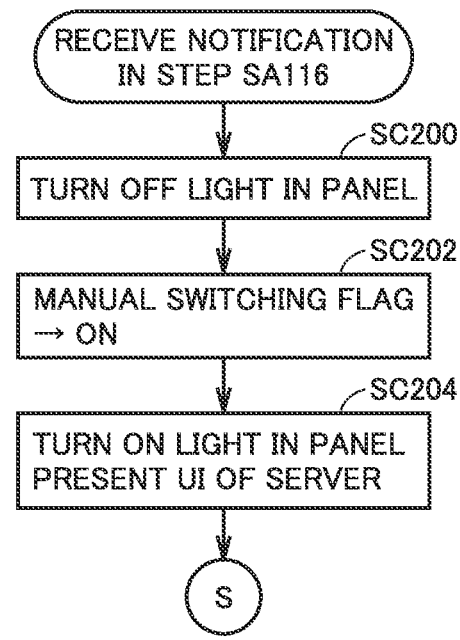

FIG. 15 shows a process performed by CPU 250 in response to the notification from CPU 150 to server 20 in step SA116.

As shown in FIG. 15, CPU 250 instructs manipulation panel 30 to turn off light in a step SC200. In response to the instruction, manipulation panel 30 turns off light in display 360.

In a step SC202, CPU 250 changes the setting value of the item "MANUAL SWITCHING FLAG" in storage 270 from "OFF" to "ON".

In a step SC204, CPU 250 instructs manipulation panel 30 to turn on light and transmits the presentation information of the UI of server 20. The control in step SC204 corresponds to the control in step SC20 of FIG. 12. In response to the transmission of the presentation information in step SC204, control circuit 350 of manipulation panel 30 presents the UI of server 20 on display 360. Then, the control proceeds to step SC300 (FIG. 16).

With reference to FIG. 16, CPU 250 determines whether or not manipulation panel 30 is manipulated in step SC300. When manipulation information is received from manipulation panel 30, CPU 250 determines that manipulation panel 30 is manipulated. When no manipulation information is received from manipulation panel 30, CPU 250 determines that manipulation panel 30 is not manipulated.

When it is determined that manipulation panel 30 is manipulated (YES in step SC300), CPU 250 brings the control to a step SC320. When it is determined that manipulation panel 30 is not manipulated (NO in step SC300), CPU 250 brings the control to a step SC302.

In step SC320, CPU 250 determines whether or not the manipulation onto manipulation panel 30 as detected in step SC300 is a manipulation (manipulation onto key 324 of FIG. 5) for switching the mode of manipulation panel 30 from the server mode to the MFP mode. When it is determined that the manipulation onto manipulation panel 30 is a manipulation for switching the mode as described above (YES in step SC320), CPU 250 brings the control to a step SC400 of FIG. 17. When it is determined that the manipulation onto manipulation panel 30 is not such a manipulation (NO in step SC320), CPU 250 brings the control to a step SC328.

In step SC302, CPU 250 determines whether or not a job to be performed by MFP 10 is detected. Server 20, which also functions as a print server, is configured to receive, from another apparatus via a network, an instruction for MFP 10 to execute the print job. One example of CPU 250 detecting the job to be performed by MFP 10 is CPU 250 receiving the instruction for MFP 10 to execute the print job. When it is determined that the job to be performed by MFP 10 is detected (YES in step SC302), CPU 250 brings the control to a step SC308. When it is determined that the job to be performed by MFP 10 is not detected (NO in step SC302), CPU 250 brings the control to a step SC326.

In step SC326, CPU 250 determines whether or not a manipulation other than the manipulation onto manipulation panel 30 is performed in information processing machine 100. The manipulation other than the manipulation onto manipulation panel 30 is a manipulation to an element provided for the image processing operation, such as opening of door 10A, drawing of sheet tray 10B, or opening of the ADF cover of image scanning unit 153. When it is determined that the manipulation other than the manipulation onto manipulation panel 30 is performed (YES in step SC326), CPU 250 brings the control to a step SC330. When it is determined that the manipulation other than the manipulation onto manipulation panel 30 is not performed (NO in step SC326), CPU 250 brings the control to step SC304.

In step SC330, CPU 250 reads the setting value of the item "MANUAL SWITCHING FLAG". When the setting value of the item "MANUAL SWITCHING FLAG" indicates "ON", CPU 250 returns the control to step SC300. When the setting value of the item "MANUAL SWITCHING FLAG" indicates "OFF", CPU 250 brings the control to step SC400 of FIG. 17.

In step SC304, CPU 250 determines whether or not a state in which manipulation panel 30 is not manipulated continues for a certain time after the transition of the mode of manipulation panel 30 to the server mode. When it is determined that the state in which manipulation panel 30 is not manipulated continues for the certain time (YES in step SC304), CPU 250 brings the control to a step SC306. When it is determined that the state does not continued for the certain time (NO in step SC304), CPU 250 returns the control to step SC300.

In step SC306, CPU 250 instructs manipulation panel 30 to turn off light in display 360. Then, the control is returned to step S300.

In step SC308, CPU 250 instructs MFP 10 to be activated. In response to the instruction, CPU 150 of MFP 10 activates MFP 10 when MFP 10 is in the sleep state.

In a step SC310, CPU 250 instructs MFP 10 to execute the job detected in step SC302.

In a step SC312, CPU 250 determines whether or not manipulation panel 30 is manipulated. When it is determined that manipulation panel 30 is manipulated (YES in step SC312), CPU 250 brings the control to a step SC328. When it is determined that manipulation panel 30 is not manipulated (NO in step SC312), CPU 250 brings the control to a step SC314.

In step SC328, CPU 250 instructs manipulation panel 30 to turn on light in display 326. Then, the control is returned to step SC300 (FIG. 16). In response to the instruction in step SC328, control circuit 350 of manipulation panel 30 turns on light in display 360.

In a step SC314, CPU 250 determines whether or not the job for which MFP 10 has been instructed in step SC310 to execute is completed. In information processing machine 100 of a certain embodiment, when execution of a job is instructed from server 20, MFP 10 is configured to execute the job. In response to completion of the job, MFP 10 is configured to notify the completion of the job. For example, when the notification of the completion of the job is received from MFP 10, CPU 250 determines that the job for which MFP 10 has been instructed to execute is completed. When the notification of the completion of the job is not received from MFP 10, CPU 250 determines that the job for which MFP 10 has been instructed to execute is not completed. CPU 250 repeats the control in step SC310 and step SC312 until it is determined that the job for which MFP 10 has been instructed to execute is completed (NO in step SC314). When it is determined that the job for which MFP 10 has been instructed to execute is completed (YES in step SC314), CPU 250 brings the control to a step SC316.

In step SC316, CPU 250 reads the setting value of the item "STATE OF MFP AFTER COMPLETION OF JOB IN SERVER MODE" in storage 270. When the setting value indicates "SLEEP", CPU 250 brings the control to a step SC318. When the setting value is "ACTIVE", CPU 250 returns the control to step SC300.

In step SC318, CPU 250 instructs MFP 10 to bring MFP 10 into the sleep state. Then, the control is returned to step SC300. In response to the instruction in step SC318, CPU 150 of MFP 10 controls the state of MFP 10 to transition to the sleep state.

Figure 17:
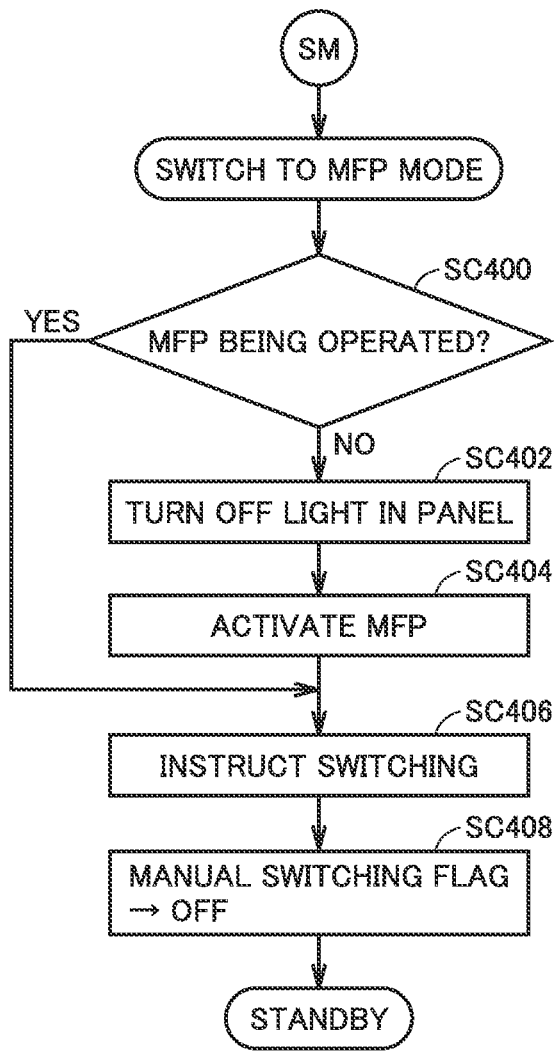

With reference to FIG. 17, CPU 250 determines in step SC400 whether or not MFP 10 is active (whether or not the state of MFP 10 is "ACTIVE"). When it is determined that MFP 10 is active (YES in step SC400), CPU 250 brings the control to a step SC406. When it is determines that MFP 10 is not active (MFP 10 is in the sleep state) (NO in step SC400), CPU 250 brings the control to a step SC402.

In step SC402, CPU 250 instructs manipulation panel 30 to turn off light in display 360.

In a step SC404, CPU 250 instructs MFP 10 to be activated. In response, CPU 150 of MFP 10 activates MFP 10.

In a step SC406, CPU 250 instructs MFP 10 to switch the mode of manipulation panel 30. The control in step SC406 corresponds to the control in step SC50 of FIG. 12.

It should be noted that in response to the instruction in step SC406, CPU 150 of MFP 10 instructs manipulation panel 30 to switch the mode of manipulation panel 30 from the server mode to the MFP mode. For example, the instruction includes an instruction for switching the port of control circuit 350 for communication from the port for communication with server 20 to the port for communication with MFP 10. Such an instruction by CPU 150 corresponds to step SA70 of FIG. 12. In response to the instruction from CPU 150, control circuit 350 of manipulation panel 30 switches the port for communication. The control of the control circuit 350 corresponds to the control in step SB60 of FIG. 12.

In a step SC408, CPU 250 changes the setting value of the item "MANUAL SWITCHING FLAG" to OFF. Then, CPU 250 stands by to wait for a notification from MFP 10. When the notification in step SA108 is received, CPU 250 starts the process of FIG. 14. When the notification in step SA116 is received, CPU 250 starts the process of FIG. 15.

9. Modification of Configuration of Information Processing System

MFP 10, server 20, and manipulation panel 30 included in the information processing system may be configured to be integrated with one another or may be configured to be separated from one another. FIG. 18 illustrates a modification of the configuration of the information processing system. In the example shown in FIG. 18, an information processing system 100A is illustrated as an exemplary information processing system. Information processing system 100A includes MFP 10, server 20, and manipulation panel 30. In information processing machine 100 shown in FIG. 1, MFP 10, server 20, and manipulation panel 30 are configured to be integrated with one another, whereas in the example of FIG. 18, MFP 10, server 20, and manipulation panel 30 are disposed to be separated from one another. MFP 10, server 20, and manipulation panel 30 communicate with one another through a wireless LAN, for example.

In the hardware configuration shown in FIG. 18, CPU 150 of MFP 10 communicates with server 20 via network communication unit 155, and CPU 250 of server 20 communicates with MFP 10 via network communication unit 260.

In the example of FIG. 18, manipulation panel 30 further includes a network communication unit 380. Network communication unit 380 is implemented by a LAN card, for example. Control circuit 350 of manipulation panel 30 communicates with MFP 10 and server 20 via network communication unit 380.

In the example of FIG. 18, for the communication via network communication unit 380, a port for communication with MFP 10 and a port for communication with server 20 are set. In the MFP mode, control circuit 350 communicates with MFP 10 using the port for communication with MFP 10. In the server mode, control circuit 350 communicates with server 20 using the port for communication with server 20.

10. Summary of Disclosure

The present disclosure can be summarized as follows.

(1) A information processing system (information processing machine 100) of the present disclosure includes: an information processing apparatus (server 20); an image processing apparatus (MFP 10) capable of communicating with the information processing apparatus; and a manipulation panel (manipulation panel 30) capable of communicating with the information processing apparatus and the image processing apparatus.

The manipulation panel includes: a manipulation unit (manipulation unit 370) that receives an input of information; and a control circuit (control circuit 350). The control circuit is operable in a first mode (MFP mode) in which the information input to the manipulation unit is transmitted to the image processing apparatus and a second mode (server mode) in which the information input to the manipulation unit is transmitted to the information processing apparatus.

The image processing apparatus include a first processor (CPU 150) configured to process the information input from the manipulation panel.

The first processor is configured to transition between a first state (active state) and a second state (sleep state), the first state being a state in which the information input from the manipulation panel is able to be processed by the first processor, the second state being a state in which the information input from the manipulation panel is unable to be processed by the first processor.

When a condition for the transition from the first state to the second state is satisfied, the first processor is configured to instruct the control circuit to transition from the first mode to the second mode and output a transition notification to the information processing apparatus, the transition notification indicating that an operation mode of the control circuit transitions to the second mode.

The information processing apparatus includes a second processor (CPU 250). The second processor is configured to process the information input from the manipulation unit in response to an input of the transition notification.

(2) The manipulation panel may include a display (display 360). The control circuit may be configured to control the display. In response to an input of the transition notification, the second processor may be configured to instruct the control circuit to temporarily halt presentation of the display (step SC100 in FIG. 14; step SC200 in FIG. 15).

(3) The manipulation panel includes a display (display 360). In response to an input of the transition notification, the second processor may be configured to instruct the control circuit to present a manipulation screen of the information processing apparatus on the display (step SC104 in FIG. 14; step SC204 in FIG. 15).

(4) The manipulation panel may include a display (display 360). The information processing apparatus may include a storage (storage 270) that stores a designation ("PRESENTATION OF MANIPULATION PANEL IN SERVER MODE" in FIG. 11) as to whether or not the display presents a manipulation screen of the information processing apparatus in the second mode. In response to an input of the transition notification, the second processor may be configured to instruct the control circuit to control the display in accordance with the designation stored in the storage (steps SC102, SC104 in FIG. 14).

(5) The manipulation unit may include a key (key 314) for inputting information for satisfying the condition.

(6) The image processing apparatus may include one or more elements provided for an image processing operation (image processing element(s) such as image processing unit 151, image forming unit 152, image scanning unit 153, and/or facsimile communication unit 154).

When an element is manipulated after the input of the transition notification (YES in step SC326), the second processor may be configured to maintain the state for processing the information input to the manipulation unit if the transition notification is output in response to the input of the information via the key ("MANUAL SWITCHING FLAG" is ON) (step SC330 to step SC300 in FIG. 16).

When an element is manipulated after the input of the transition notification (YES in step SC326), the second processor may be configured to halt the state for processing the information input to the manipulation unit if the transition notification is output in response to an event other than the input of the information via the key ("MANUAL SWITCHING FLAG" is OFF), and instruct the first processor to transition from the second state to the first state (step SC330 in FIG. 16 to step SC406 via step SC400 in FIG. 17).

(7) The image processing apparatus may include a memory (storage 160) that stores information ("STATE IN SERVER MODE" in FIG. 10) based on which the first processor specifies whether to stop, in the second state, supply of power to a portion of the first processor that processes the information input from the manipulation panel.

In accordance with the information stored in the memory, the first processor may be configured to determine whether to stop the supply of the power to the portion when transitioning to the second state in response to the input of the information via the key.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing system comprising:
an information processing apparatus;
an image processing apparatus capable of communicating with the information processing apparatus;
a manipulation panel capable of communicating with the information processing apparatus and the image processing apparatus,
the manipulation panel including
an input interface that receives an input of information, and
a control circuit operable in a first mode in which the information input to the input interface is transmitted to the image processing apparatus or a second mode in which the information input to the input interface is transmitted to the information processing apparatus; and
a first processor capable of controlling communication of the information input from the manipulation panel,
a second processor capable of controlling the communication of the information input from the manipulation panel, and
the first processor determining whether or not a state of the image processing apparatus transitions from a first state to a second state, the first state being a state in which the information input from the manipulation panel is able to be processed, the second state being a state in which the information input from the manipulation panel is unable to be processed,
when the first processor determines that the state of the image processing apparatus transitions from the first state to the second state, the first processor instructing the control circuit of the manipulation panel to transition from the first mode to the second mode and outputting a transition notification to the information processing apparatus, the transition notification indicating that an operation mode of the control circuit transitions to the second mode; and
when a specific manipulation for an image processing operation is performed onto the image processing apparatus, the second processor instructing the control circuit of the manipulation panel to transition from the second mode to the first mode and outputting a transition notification to the image processing apparatus, the transition notification indicating that the operation mode of the control circuit transitions to the first mode.

2. The information processing system according to claim 1, wherein the second state is a sleep state of the image processing apparatus.

3. The information processing system according to claim 1, wherein the first processor is included in the image processing apparatus.

4. The information processing system according to claim 1, wherein the input interface includes a key for inputting a switching instruction to switch between the first mode and the second mode.

5. The information processing system according to claim 4, wherein
when the specific manipulation for the image processing operation is performed onto the image processing apparatus after the transition notification is input to the information processing apparatus,
the second processor transmits information for transitioning from the second mode to the first mode if the transition notification is not output in response to the input of the switching instruction, and
the second processor maintains the second mode if the transition notification is output in response to an event other than the input of the information via the key.

6. The information processing system according to claim 4, wherein
the image processing apparatus includes a memory that stores information based on which the first processor specifies whether to stop, in the second state, supply of power to a portion of the first processor that processes the information input from the manipulation panel, and
in accordance with the information stored in the memory, the first processor determines whether to stop the supply of the power to the portion when transitioning to the second state in response to the input of the information via the key.

7. The information processing system according to claim 1, wherein
the manipulation panel includes a display,
the control circuit controls the display, and
in response to an input of the transition notification to the information processing apparatus, the second processor instructs the control circuit to temporarily halt presentation of the display.

8. The information processing system according to claim 1, wherein
the manipulation panel includes a display, and
in response to an input of the transition notification to the information processing apparatus, the second processor instructs the control circuit to present a manipulation screen of the information processing apparatus on the display.

9. The information processing system according to claim 1, wherein
the manipulation panel includes a display,
the information processing apparatus includes a storage that stores a designation as to whether or not the display presents a manipulation screen of the information processing apparatus in the second mode, and
in response to an input of the transition notification to the information processing apparatus, the second processor instructs the control circuit to control the display in accordance with the designation stored in the storage.

10. The information processing system according to claim 1, wherein the input interface includes a key for inputting a switching instruction to switch between the first mode and the second mode.

11. An image processing apparatus capable of communicating with an information processing apparatus and a manipulation panel,
the manipulation panel being operable in a first mode in which information input to the manipulation panel is transmitted to the image processing apparatus or a second mode in which the information input to the manipulation panel is transmitted to the information processing apparatus,
the image processing apparatus comprising a first processor capable of controlling communication of the information input from the manipulation panel,
a second processor capable of controlling the communication of the information input from the manipulation panel, and
the first processor determining whether to transition from a first state to a second state, the first state being a state in which the information input from the manipulation panel is able to be processed by the image processing apparatus, the second state being a state in which the information input from the manipulation panel is unable to be processed by the image processing apparatus, and
when the first processor determines that the image processing apparatus transitions from the first state to the second state, the first processor instructing the manipulation panel to transition from the first mode to the second mode and outputting a transition notification to the information processing apparatus, the transition notification indicating that an operation mode of the manipulation panel transitions to the second mode; and
when a specific manipulation for an image processing operation is performed onto the image processing apparatus, the second processor instructing the manipulation panel to transition from the second mode to the first mode and outputting a transition notification to the image processing apparatus, the transition notification indicating that the operation mode of the manipulation panel transitions to the first mode.

12. A non-transitory storage medium that stores a control program executed by a computer of an image processing apparatus capable of communicating with an information processing apparatus and a manipulation panel,
the manipulation panel being operable in a first mode in which information input to the manipulation panel is transmitted to the image processing apparatus or a second mode in which the information input to the manipulation panel is transmitted to the information processing apparatus,
the control program causing the computer to:
determine whether or not a state of the image processing apparatus transitions from a first state to a second state, the first state being a state in which the information input from the manipulation panel is able to be processed, the second state being a state in which the information input from the manipulation panel is unable to be processed; and
when determining that the state of the image processing apparatus transitions from the first state to the second state, instruct the manipulation panel to transition from the first mode to the second mode and output a transition notification to the information processing apparatus, the transition notification indicating that an operation mode of the manipulation panel transitions to the second mode; and
when a specific manipulation for an image processing operation is performed onto the image processing apparatus, instruct the manipulation panel to transition from the second mode to the first mode and output a transition notification to the image processing apparatus, the transition notification indicating that the operation mode of the manipulation panel transitions to the first mode.

13. A method for controlling an image processing apparatus capable of communicating with an information processing apparatus and a manipulation panel, the manipulation panel being operable in a first mode in which information input to the manipulation panel is transmitted to the image processing apparatus or a second mode in which the information input to the manipulation panel is transmitted to the information processing apparatus, the method comprising:

determining whether or not a state of the image processing apparatus transitions from a first state to a second state, the first state being a state in which the information input from the manipulation panel is able to be processed, the second state being a state in which the information input from the manipulation panel is unable to be processed; and when determining that the state of the image processing apparatus transitions from the first state to the second state, instructing the manipulation panel to transition from the first mode to the second mode and outputting a transition notification to the information processing apparatus, the transition notification indicating that an operation mode of the manipulation panel transitions to the second mode; and when a specific manipulation for an image processing operation is performed onto the image processing apparatus, instructing the manipulation panel to transition from the second mode to the first mode and outputting a transition notification to the image processing apparatus, the transition notification indicating that the operation mode of the manipulation panel transitions to the first mode.

* * * * *